United States Patent
Brun et al.

(10) Patent No.: US 10,248,089 B2
(45) Date of Patent: Apr. 2, 2019

(54) GROUPING FOR FLEXIBLE ROOM ARRANGEMENTS

(71) Applicant: Siemens Schweiz AG, Zurich (CH)

(72) Inventors: Gerhard Brun, Lucerne (CH);
Heinrich Meier, Schindellegi (CH);
Franz Renggli, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 151 days.

(21) Appl. No.: 15/102,633

(22) PCT Filed: Dec. 4, 2014

(86) PCT No.: PCT/EP2014/076638
§ 371 (c)(1),
(2) Date: Jun. 8, 2016

(87) PCT Pub. No.: WO2015/086439
PCT Pub. Date: Jun. 18, 2015

(65) Prior Publication Data
US 2016/0320760 A1  Nov. 3, 2016

(30) Foreign Application Priority Data
Dec. 11, 2013  (EP) ..................................... 13196765

(51) Int. Cl.
*G05B 19/42*  (2006.01)
*G05B 19/042*  (2006.01)
(Continued)

(52) U.S. Cl.
CPC ....... *G05B 19/042* (2013.01); *G05B 19/0421* (2013.01); *G05B 2219/2642* (2013.01)

(58) Field of Classification Search
CPC . H04L 12/2803; H04L 12/2838; G05B 15/02; G05B 11/01; G05D 23/1931
(Continued)

(56) References Cited

U.S. PATENT DOCUMENTS 6,563,430 B1  5/2003  Kemink et al. ................ 340/8.1
6,792,323 B2  9/2004  Krzyzanowski et al. ...... 700/90
(Continued)

FOREIGN PATENT DOCUMENTS

CN          1759386 A    4/2006    ............. G06F 13/00
CN        101688912 A    3/2010    ............... G01S 5/16
(Continued)

OTHER PUBLICATIONS

International Search Report and Written Opinion, Application No. PCT/EP2014/076638, 8 pages, dated Dec. 23, 2014.
(Continued)

*Primary Examiner* — Michael J Brown
(74) *Attorney, Agent, or Firm* — Slayden Grubert Beard PLLC

(57) ABSTRACT

Flexible control is provided in building automation. By dividing a floor space into segments, different segments may be assigned to rooms. The operation of the building automation likewise includes room level and segment level control functions and corresponding objects. To assign or reassign a given segment to a room, the segment is linked to the room using an identifier of the corresponding room control function. The building automation equipment and corresponding control for the segment is linked to the room operation. The separation of the room and segment functions may avoid any or extensive manual engineering other than re-assignment. The assignment or reassignment of segments to rooms may be performed online (e.g., at a panel or management station), offline (e.g., at a computer or engi-
(Continued)

neering station), or automatically (e.g., moveable wall system).

20 Claims, 9 Drawing Sheets

(51) Int. Cl.
*G05B 15/02* (2006.01)
*G05B 11/01* (2006.01)
*F24F 1/00* (2011.01)

(58) Field of Classification Search
USPC .................................................. 700/275
See application file for complete search history.

(56) References Cited

U.S. PATENT DOCUMENTS 9,400,493 B2   7/2016  Brun et al.
2005/0086876 A1   4/2005  Clark ............................. 52/79.1
2010/0225484 A1   9/2010  Van De et al. ............. 340/572.4
2011/0301764 A1*  12/2011  Lapierre ............ G05B 19/0426
                                                            700/275
2013/0178951 A1   7/2013  Sandler ............................ 700/23
2013/0218349 A1*  8/2013  Coogan .................. G05B 13/02
                                                            700/275

FOREIGN PATENT DOCUMENTS

CN          103034182 A      4/2013   ............ G05B 19/418
FR             2939553 A1     6/2010   ............. G08B 25/00
WO         2015/086439 A1    6/2015   ............. G05B 15/02

OTHER PUBLICATIONS

Chinese Office Action, Application No. 201480067814.5, 16 pages, dated Mar. 16, 2018.

* cited by examiner

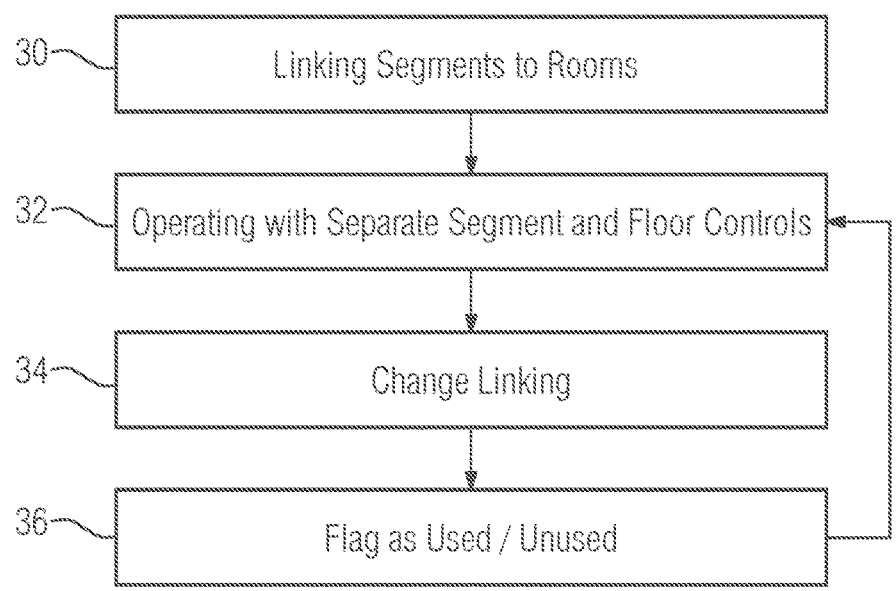

GROUPING FOR FLEXIBLE ROOM ARRANGEMENTS

CROSS-REFERENCE TO RELATED APPLICATIONS

This application is a U.S. National Stage Application of International Application No. PCT/EP2014/076638 filed Dec. 4, 2014, which designates the United States of America, and claims priority to EP Application No. 13196765.5 filed Dec. 11, 2013, the contents of which are hereby incorporated by reference in their entirety.

TECHNICAL FIELD

The present embodiments generally relate to building systems and, more particularly, to controlling or designing building automation for changes to floor plans.

BACKGROUND

A building automation system performs monitoring, open-loop control, and/or closed-loop control of process variables in technical systems in a building or in a campus. The technical systems are heating, ventilation and air-conditioning (HVAC) systems, lighting and shading (e.g., blinds) devices, access control systems, security systems, and/or fire surveillance systems. In the building automation system, process variables, such as room air conditioning variables or events, are detected, evaluated, monitored, influenced and/or generated.

The building automation system typically includes programs and a number of computers or processors for their operation. Programming is provided to perform the distributed building automation. Due to the repetitive nature of floor plans, such as having multiple rooms of similar configuration, identical or similar control programs are present in a single or multiple field panel controllers within the building automation system. The individual control programs or applications are each adapted to include separately addressable point or BACnet objects for separate communication with the associated field devices connected with the controller. Moreover, control programs may be customized for the specific number of inputs of field devices, making the process inefficient for originally creating and inefficient for changing.

For initial design, a floor plan is provided. The building automation system, including the various programs, is created for the given floor plan. Engineering the programs may be inefficient. Over time, the floor plan may change. Altering the programming in the building automation system to account for the change is time consuming given the customized inputs and control loops. Each control program associated with a changed room is manually altered. Pre-loaded applications may need to be changed. Field bus technology features, such as LonMark-Binding or KNX-Binding (S-Mode, LTE-Mode) may be used to combine room masters and slaves and rearrange room slaves over time, but still require manual engineering. Dedicated engineering tools provide offline binding and loading of binding tables, which may save some time but still require design work to account for an alteration.

SUMMARY

One embodiment provides a system for arranging rooms in building automation, the system comprising sets of environmental control equipment, each set being for separate segments of a floor of a building; one or more controllers for the floor of the building, the one or more controllers configured to control the sets of the environmental control equipment; and an interface configured to receive input linking the segments with rooms, the linking assigning a room identifier to one or more respective segments linked with the room; wherein the one or more controllers include room objects and segment objects, the segment objects configured to control respective sets of the environmental control equipment, the room objects configured to control an environment of the respective rooms of the floor, the room objects configured to interact with the linked segment objects having the corresponding room identifiers.

In one embodiment, the interface is configured to receive a change in the linking of one of the segments from a first one of the rooms to a second one of the rooms, the change reassigning the one segment from the room identifier of the first room to the room identifier of the second room, wherein the controllers are configured so that the room object for the first room ceases interaction with the segment object for the one segment and the room object for the second room begins interaction with the segment object for the one segment based on the change.

In one embodiment, the one or more controllers are configured to exchange data and set points between the room objects and linked segment objects based on the room identifier without additional user input other than the change.

In one embodiment, the interface comprises a user interface and wherein the input comprises a user dragging graphics of the segments to graphics of the rooms or the user assigning the room identifier to the segments.

In one embodiment, the sets of environmental equipment comprise heating, ventilation, and air conditioning equipment, lighting equipment, shading equipment, room units, or combinations thereof.

In one embodiment, the one or more controllers comprise a multi-room controller configured to operate the room objects for the rooms and the segment objects for the segments.

In one embodiment, the one or more controllers comprise a compact controller for each of the segments, each compact controller including the respective segment object, and one of the compact controllers for each of the rooms including the room object.

In one embodiment, other compact controllers for one of the rooms than the one compact controller include the respective room objects flagged as unused and the one compact controller includes the respective room object flagged as used.

In one embodiment, the interface comprises a user interface of a computer hosting an engineering tool.

In one embodiment, the interface comprises a user interface of the one or more controllers.

In one embodiment, the interface comprises a sensor interface configured to receive the input linking as a sensed change in a wall.

In one embodiment, the interface comprises a management station configured to reassign the linking of one of the segments to another of the rooms, and wherein the one or more controllers are configured to operate with the room and segment objects with the reassigned linking and without downloading a control program from the management station to the one or more controllers.

Another embodiment provides a method for arranging rooms in building automation, the method comprising: operating first environmental control equipment of a first segment of a floor with a first room control; changing a first value of a first room identifier for the first segment to a second value, the first value linked with the first room control and the second value linked with a second room control, the first room control for a first room of the floor and the second room control for a second room of the floor; and operating, by a controller, the first environmental control equipment of the first segment of the floor with the second room control after the changing and without downloading the second room control to the controller as part of or after the changing.

In one embodiment, the method further comprises altering a flag for the first room control from used to unused.

In one embodiment, changing comprises dragging a first graphic for a segment identifier for the first environmental control equipment to a second graphic for the second room.

In one embodiment, changing comprises receiving a change in a position of a wall of the floor and changing in response to the change in position of the wall.

In one embodiment, the method further comprises flagging the first room control as unused for the operating of the first environmental control equipment of the first segment of the floor with the second room control.

In one embodiment, operating the first environmental control equipment with the first room control comprises controlling the first environmental control equipment with a first segment data object and controlling the first segment data object with the first room control, the first segment data object including the first room identifier, and wherein operating the first environmental control equipment with the second room control comprises controlling the first environmental control equipment with the first segment data object and controlling the first segment data object with the second room control, the first room control and the second room control configured to operate with different linkings of different segment data objects, including the first segment data objects, without replacement.

Another embodiment provides a non-transitory computer readable storage medium having stored therein data representing instructions executable by a programmed processor for arranging rooms in building automation, the storage medium comprising instructions for: operating room segment functions and room functions separately, the room functions being for rooms of a floor and the room segment functions being for respective collections of environmental control equipment; linking multiple of the room segment functions to a first one of the room functions by a label of the first room function; linking a second of the room segment functions to a second one of the room functions by a label of the second room function; and exchanging information between the linked room segment functions and the respective room functions based on the corresponding label.

In one embodiment, the instructions are further executable to change the linking of the second room segment function to the first room function with a change to the label of the first room function; and flag the second room function as unused.

BRIEF DESCRIPTION OF THE DRAWINGS

Example embodiments and aspect of the invention are discussed in detail below with reference to the drawings, in which:

FIG. 8 is a flow chart diagram of one embodiment of a method for arranging rooms in building automation.

DETAILED DESCRIPTION

Figure 1:
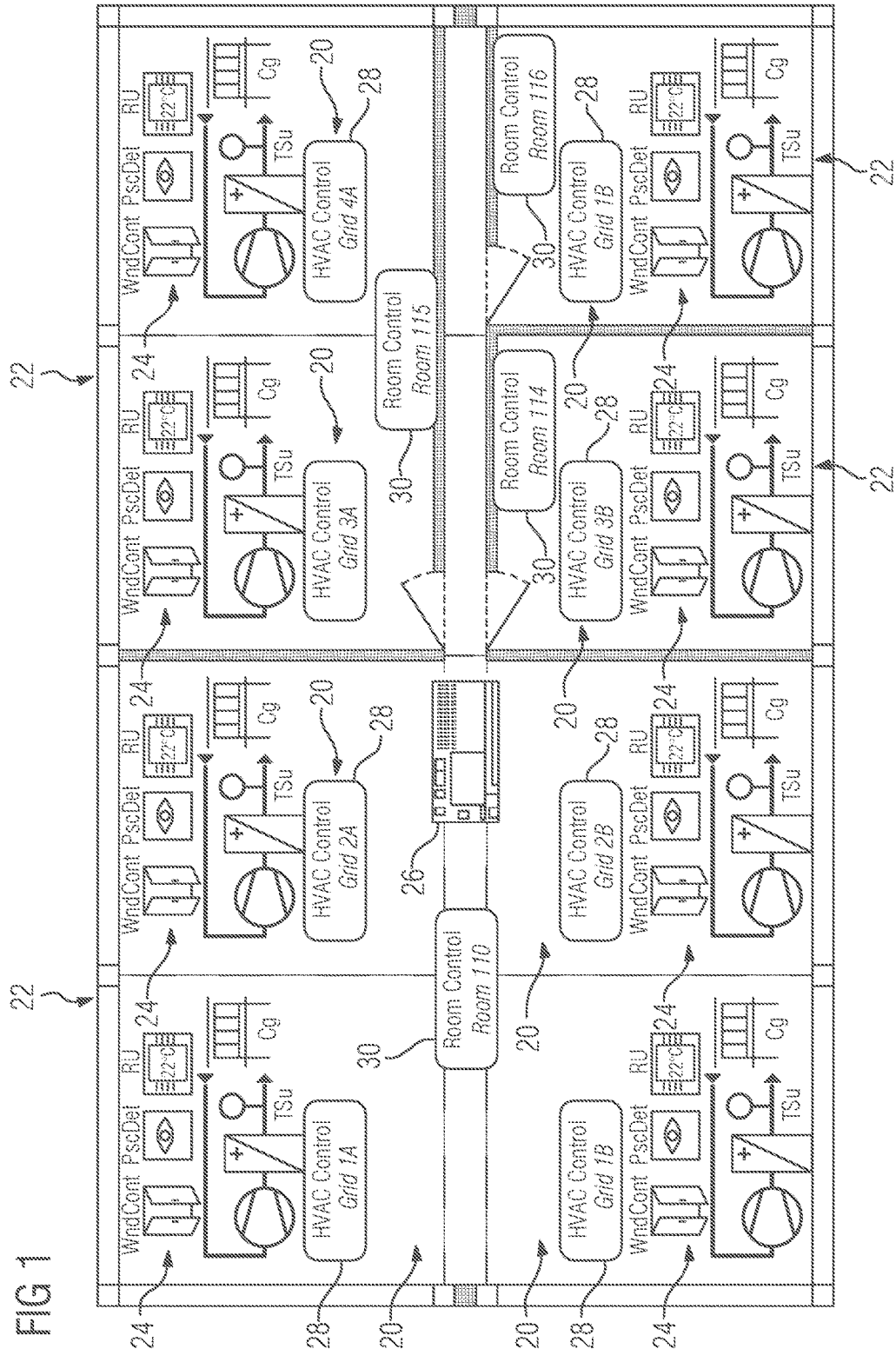
FIG. 1 shows an example floor plan and building automation arrangement.

By way of introduction, embodiments described below include methods, systems, instructions, and computer readable media for arranging rooms in building automation. By dividing a floor space into segments, different segments may be assigned to rooms. The operation of the building automation likewise includes room level and segment level control functions and corresponding objects. To assign or reassign a given segment to a room, the segment is linked to the room using an identifier of the corresponding room control function. The building automation equipment and corresponding control for the segment is linked to the room operation. The separation of the room and segment functions may avoid any or extensive manual engineering other than re-assignment. The assignment or reassignment of segments to rooms may be performed online (e.g., at a panel or management station), offline (e.g., at a computer or engineering station), or automatically (e.g., moveable wall system).

In a first aspect, a system is provided for arranging rooms in building automation. Sets of environmental control equipment are provided where each set is for separate segments of a floor of a building. One or more controllers for the floor of the building are configured to control the sets of the environmental control equipment. An interface is configured to receive input linking the segments with rooms. The linking assigns a room identifier to one or more respective segments linked with the room. The one or more controllers include room objects and segment objects. The segment objects are configured to control respective sets of the environmental control equipment, and the room objects are configured to control an environment of the respective rooms of the floor. The room objects are configured to interact with the linked segment objects having the corresponding room identifiers.

In a second aspect, a method is provided for arranging rooms in building automation. First environmental control equipment of a first segment of a floor is operated with a first room control. A first value of a first room identifier for the first segment is altered to a second value. The first value is linked with the first room control, and the second value is linked with a second room control. The first room control is for a first room of the floor, and the second room control is for a second room of the floor. A controller operates the first environmental control equipment of the first segment of the floor with the second room control after the changing and without downloading the second room control to the controller as part of or after the changing.

In a third aspect, a non-transitory computer readable storage medium has stored therein data representing instructions executable by a programmed processor for arranging rooms in building automation. The storage medium includes instructions for operating room segment functions and room functions separately, the room functions being for rooms of a floor and the room segment functions being for respective collections of environmental control equipment, linking multiple of the room segment functions to a first one of the room functions by a label of the first room function, linking a second of the room segment functions to a second one of the room functions by a label of the second room function, and exchanging information between the linked room segment functions and the respective room functions based on the corresponding label.

The present invention is defined by the following claims, and nothing in this section should be taken as a limitation on those claims. Further aspects and advantages of the invention are discussed below in conjunction with the preferred embodiments and may be later claimed independently or in combination.

The building automation control and design programming accounts for flexibility in room arrangements. Room and room-segment functionality split for control functions but are grouped for flexibility in room arrangements.

There is an increasing demand for a flexible subdivision of floors and zones of a building to arrange the spaces to the constantly changing needs in a building's life cycle. To ensure maximum flexibility, the floors are partitioned into room segments (e.g., grids) that may be combined to form rooms and rearranged over time by simply adding and removing walls. In one example use case, a new floor design is created for a tenant build out. Room arrangements are initially set up for a tenant and rarely change over time. A building automation engineer sets up the room configuration for building automation using an offline engineering tool. In another example use case, the floor plan is rebuilt. Room arrangements may be occasionally (e.g. every 1-2 years) changed. A technician, facility manager, or care taker may adapt the control program to the respective room configuration using an onsite configuration tool of the building automation system, such as a Web application, or using a management station. In yet another example use case, the floor plan includes one or more movable walls. Room arrangements of conference centers or meeting rooms may be regularly (e.g. every day) changed. A control program triggered by moving a sliding wall automatically adapts to the respective room configuration.

The building automation system may be designed to alter control to account for the change in room configuration. Configuration flexibility is supported in a way that may minimize the engineering effort when rooms are to be rearranged or used differently. This flexibility may also benefit initial design of the control program of the building automation. Using separated segment and room control functions, room configuration may be accounted for with simple assignment or reassignment of the segment control function to a room function. For example, the separated functions allow a simple reassignment of environmental control equipment from room to room by changing only a room identification for a segment. The information for operating transfers based on the changed room identification. The simple change of the room identification allows for online change with a management station without downloading. This flexible structure allows for flexible distribution of application functions over different automation stations and enables flexible room assignment in general.

Figure 2:
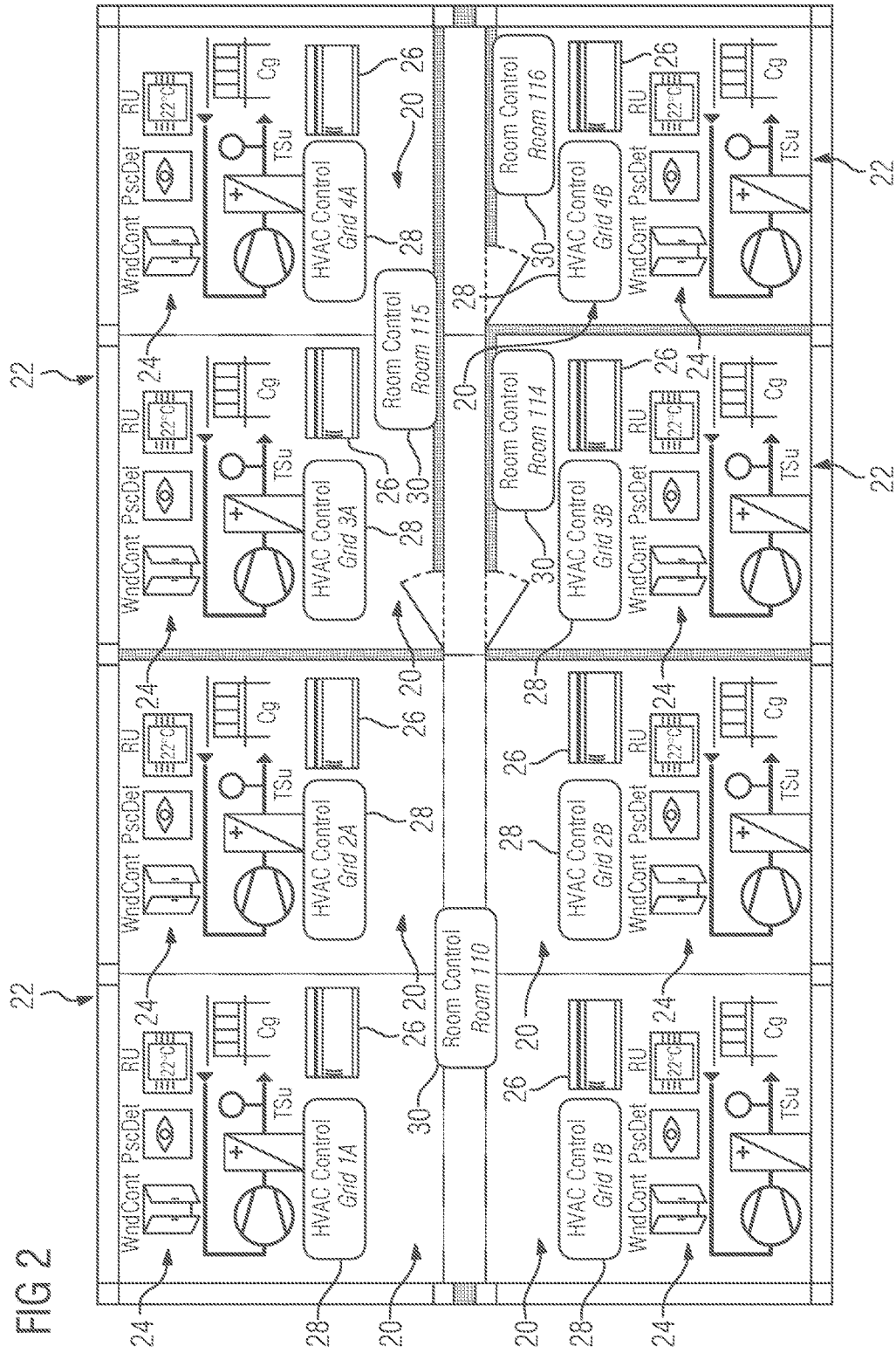
FIG. 2 shows the example floor plan with another building automation arrangement.

FIGS. 1 and 2 show example systems for arranging rooms in building automation. The systems are building automation systems overlaid on a floor plan. The building automation system is depicted as a distributed building system that provides control functions for any one of a plurality of building operations. Building automation systems may include HVAC systems, security systems, life or fire safety systems, access control systems, industrial control systems, lighting systems, window blinds and/or awning control systems, and/or the like. An example of a building automation system is the APOGEE® system commercially available from Siemens Industry, Inc. of Buffalo Grove, Ill. and the DESIGO® system commercially available from Siemens Schweiz AG of Zug, Switzerland. The APOGEE® system and the DESIGO® system each allow the setting and/or changing of various controls. Other now known or later developed building automation systems may be used.

The floor plan includes a plurality of rooms 22. The rooms 22 are separated by walls, doors, or other physical or conceptual separators. Each room 22 is a common space within a building. Each room 22 may or may not include windows. Three different sized rooms 22 are shown in the example of FIGS. 1 and 2, but fewer or more numbers of different sizes may be used. Additional, different, or fewer rooms may be provided.

The floor or part of a floor represented by the floor plan is divided into segments 20. To facilitate a flexible room arrangement, the floor or larger space is partitioned into room segments 20 different than rooms 22. Neighboring room segments 20 may be combined to form different rooms 22 as the rooms 22 are rearranged over time by adding and removing walls. The segments 20 have a regular or irregular spacing. The segments 20 are of one size or area, but may have different sizes or areas. In the embodiment shown in FIGS. 1 and 2, the segments 20 are sized the same as the smallest room 22 for which separate building equipment 24 is provided. Larger rooms 22 include more than one segment 20, such as two, three, four or more segments 20, and as a result, include more than one set of equipment 24.

The building automation system includes environmental control equipment 24 and one or more controllers 26. Additional, different or fewer components may be provided. For example, environmental control equipment 24 is not provided for one or more rooms 22 and/or segments 20. As another example, one or more communications networks, management stations, or other building automation components are provided.

In the example of FIGS. 1 and 2, each segment 20 includes a set of environmental control equipment 24. Each set is of one or more pieces of equipment. The same or similar environmental control equipment 24 is provided for each segment 20. Some differences may occur. For example, a segment 20 with no windows may not include blinds and corresponding blind controls where a segment 20 with a window does include blinds and blind controls. As another example, one or more segments 20 may have different type or size of HVAC equipment. In one embodiment, the same HVAC or other building automation equipment 24 is installed in every room segment 20. Each set is for a separate segment 20 of the floor of the building.

The environmental control equipment 24 is heating, ventilation, and air conditioning (HVAC) equipment, lighting (e.g., lights and/or blinds) equipment, room units, fire equipment, safety equipment, access equipment, or combinations thereof. Any combination of sensors, actuators, user input devices, displays, air handling, safety, or other equipment may be used. Heating without air conditioning or vice versa may be provided. FIGS. 1 and 2 show example collections of a supply air temperatures sensor (TSu), a heating coil, a fan, a chilled ceiling, a window contact (WndCont), a presence detector (PscDet), and a room unit (RU). The sensors may be temperature, pressure, rate, current, voltage, inductance, capacitance, chemical, flow, or other sensors. Any number of sensors may be used. The actuators may be gas, magnetic, electric, pneumatic, or other devices for altering, moving, heating, cooling, alarming, drilling, welding, mixing, spinning, changing, or otherwise actuating. For example, an HVAC system includes temperature sensors and ventilation damper controls as well as other elements that are located in virtually every area of a facility. As another example, each set of environmental control equipment includes lights, thermostats, temperature sensors, fans, damper actuators, heaters, chillers, alarms, other HVAC devices, and/or numerous other types of field devices. Similarly, a security system may have intrusion detection, motion sensors and alarm actuators dispersed throughout an entire building or campus. Likewise, fire safety systems include smoke alarms and pull stations dispersed throughout the facility.

The environmental control equipment 24 is capable of receiving control signals from and/or sending signals to controllers 26 of the building automation system. Accordingly, the automation system is able to control various aspects of building operation by controlling and monitoring the environmental control equipment 24.

The building automation system also includes one or more controllers 26. FIG. 1 shows one controller 26 for the floor or a group of rooms 22 on a floor. FIG. 2 shows separate controllers 26 for each segment 20. Other distributions of controllers 26 may be provided, such as having a single controller 26 for each room 22.

The controllers 26 are interconnected using a building automation network. Similarly, one or more management stations (e.g., computers or workstations on the building automation network) may be connected. A firewall or other networking components may be provided for remote access to the building automation system. Any networking or communications may be used, such as TCP/IP, master slave token pathing (MSTP), or KONNEX (KNX). BACnet and/or other protocols that support data communications may operate as overlays on the network or networks. In some embodiments, the controllers 26 may function as a router enabling communication between various components.

The building automation system implements control processes using controllers 26. The controllers 26 are panels, programmable logic controllers, workstations, operator stations, and/or remote terminal units. The controllers 26 include computers, processors, circuits, or other programmable devices for automation of electromechanical, chemical, pneumatic, fluid, electrical, mechanical, air, or other processes. For example, the controllers 26 control machinery on assembly lines, heating-ventilation-air conditioning (HVAC), fire, safety, lighting, refinery flow, mixing, or other devices or processes.

In the example of FIG. 1, the controller 26 is a multi-room controller configured to operate the control functions for different rooms and segments. For example, a modular controller (e.g., PXC3 available from Siemens) automates and control multiple rooms and room segments. The controller 26 uses a field level network (FLN) to exchange data with the environmental control equipment 24.

In the example of FIG. 2, each of the controllers 26 is a compact controller provided in each segment 20 with the environmental control equipment 24. For example, a DXR controller available from Siemens is used to automate and control one room 22 and/or segment 20. Other controllers may be used.

Figure 3:
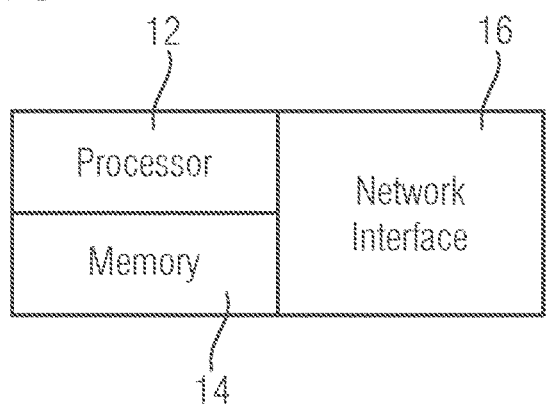
FIG. 3 is a block diagram of one embodiment of a controller.

FIG. 3 illustrates one embodiment of one or more controllers 26. The controllers 26 are not required to be identical where more than one is provided. For example, the controllers 26 are purpose built to withstand stresses and forces in respective segments, which may be subject to different environments.

The components of the controller 26 include a processor 12, memory 14, and network interface 16. These parts provide for operation and communication in the building automation system. Additional, different, or fewer parts may be provided. For example, a display is provided. Any type of display may be used, such as LEDs, monitor, LCD, projector, plasma display, touch screen, CRT, or printer.

The processor 12 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for use in the industrial control network. The processor 12 is a single device or multiple devices operating in serial, parallel, or separately. The processor 12 may be a main processor of a computer, such as a laptop or desktop computer, or may be a processor for handling tasks in a purpose-built system, such as in a programmable logic controller or panel. The processor 12 is configured by software and/or hardware.

The memory 14 is a system memory, random access memory, cache memory, hard drive, optical media, magnetic media, flash drive, buffer, database, graphics processing memory, video random access memory, combinations thereof, or other now known or later developed memory device for storing data. The memory 14 stores one or more datasets representing sensor readings, set points, and/or actuator status. The memory 14 may store calculated values or other information for reporting or operating in the network. For example, event data is stored. The memory 14 may buffer or store received communications, such as storing messages for parsing. Control functions and/or programming objects may be stored.

The memory 14 or other memory is a non-transitory computer readable storage medium storing data representing instructions executable by the programmed processor 12 for arranging for control of rooms in building automation. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The network interface 16 is a physical connector and associated electrical communications circuit for networked communications. For example, a network card is provided. As another example, a jack or port is provided. In one embodiment, the network interface 16 includes an Ethernet connector and corresponding circuit, such as a PHY chip, a PL-link port, and/or a master-slave token pathing (MSTP) port. Multiple ports of a given type may be used. Alternatively, wireless or other wired connection is provided as the interface.

The controllers 26 have network addresses or other identity for communicating within the building automation system. The sensors or actuators of the environmental control equipment 24 may or may not have network addresses, since the networking of communications for the environmental control equipment 24 may be by direct connection to ports on the controllers 26. The network addresses correspond to the physical network interface 16 for the controller 26. Communications within the building automation system are routed to and from the controllers 26 over one or more of the communications links. The physical network interfaces 16 connect the controllers 26 to the building automation system for receiving and transmitting communications, such as messages.

The controllers 26 are configured to provide overall control and monitoring of the building automation system in accordance with any commands. The controller 26 may operate as a data server that is capable of exchanging data with various elements of the environmental control equipment 24. As such, the controller 26 may allow access to system data by various applications that may be executed on the controller 26 or other supervisory computers such as a management server or client workstation.

Referring again to FIGS. 1 and 2, the controllers 26 are configured to control the sets of the environmental control equipment 24. The controllers 26 may be configured to operate based on programming. The controllers 26 include control logic for operating and/or monitoring the building automation. Based on input at a user interface and/or a project provided over the network, the controllers 26 are configured to report events and/or to control one or more aspects of the industrial process, fire safety, lighting, HVAC or other automation. The programs for operation may be provided using preloaded applications (e.g., loaded by a manufacturer of the controller 26), provided by download from a library of applications, an application adapted by an engineer online or offline, a custom created application, or other source.

For flexibility in room design, the programming of the controllers 26 is divided into different objects and corresponding control functions. A same controller 26 runs instances of multiple types of control functions. The control functions and objects include segment functions and objects and room functions and objects. Each controller 26 or a sub-set of the controllers 26 include both room and segment level control functions. Automation and control functionality is split into room functions responsible to control and coordinate the overall room functionality and into room segment functions responsible to automate and control the equipment 24 of respective room segments 20. The splitting of room and segment functions and providing for respective data exchange between these functions using room and segment objects supports a variety of possible automation and control variations. Flexibility in room configuration for the building automation is provided.

FIGS. 1, 2, 4A and 4B show two examples of separated control functions and corresponding objects. Segment level control function is represented as 28, and room level control function is represented as 30. One room control function 30 is provided for each room 22, and one segment control function 28 is provided for each segment 20.

Figure 4A:
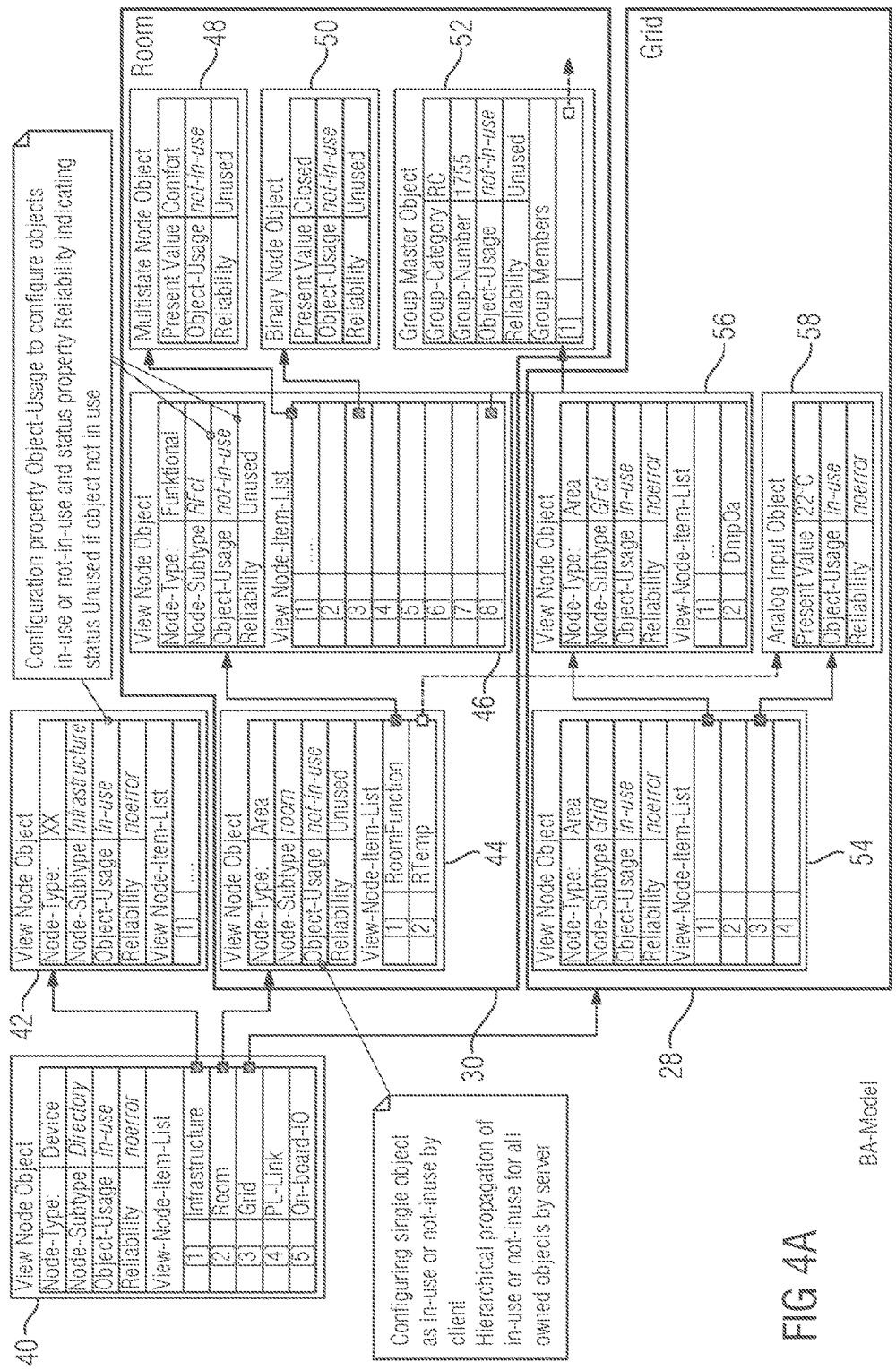
FIGS. 4A and 4B show example objects for control functions and communications in a building automation system.

The segment level control functions 28 are configured to control respective sets of the environmental control equipment 24. A segment control function and corresponding object or objects are provided for each segment 20. The segment functions 28 include the open and closed loop control and interlock functions of the individual HVAC or other building automation equipment. The equipment 24 of a segment 20 is modeled in the segment control software of the building automation system using an object-oriented approach. FIG. 4A shows a node object 54 for the segment (e.g., grid) area and separate objects 58, 56 for control and input. Other objects may be provided. The models are connected via the interface 16 to the equipment 24. For example, a temperature sensor is mapped to the analog input object 58, and a damper is mapped to the functional object 56 in the building automation system.

The room level control functions 30 are configured to interact with the linked segment objects and control functions 28. The room level control functions 30 control the environment of the room 22 through control of the equipment 24 provided in the segments 20. The room control function 30 includes the room control strategies determining the commands and set points for the different equipment 24. The room level functions are modeled in the room control software of the building automation system using an object oriented approach. FIG. 4A shows a room area node object 44 indicating the various control functions to use and inputs for those functions, and function object 46, using other objects 48, 50, 52, indicates the operations to be performed. Other objects, such as a directory object 40 and an infrastructure object 42, may be provided.

Various examples of object-based programming are provided in U.S. Published Application No. 2013-0218349, (Ser. No. 13/851,695), the disclosure of which is incorporated herein by reference. Other object-based programming may be used. In other embodiments, the programming is not object oriented, such as being a sequence of instructions or having other flow structure.

By separating the room and segment functions, flexibility in initially programming the building automation for a floor plan and/or for changing the floor plan without requiring extensive redesign of the control programs for the building automation is provided. FIGS. 1 and 2 show deployment of room control functions 30 and segment control functions 28 to one or more controllers 26. The modular controller 26 of FIG. 1 runs the room control functions 30 and segment control functions 28 for multiple rooms 22 and corresponding segments 20. The segment controllers 26 of FIG. 2 run the respective segment control functions 28. For each room 22, one of the segment controllers 26 also runs the room control function 30. Distributed operation on multiple segment controllers 26 may be provided for one or more rooms in other embodiments.

For ease of programming and/or reassigning segments to different rooms, each of the segment control functions 28 is assigned to a room 22. The assignment is, represented as an identifier, such as an identifier of the room. The identifier identifies the corresponding room control function 30. The identifier is a unique label distinguishing a given room from other rooms. The identifier is text, a number, a symbol, or combination thereof. The identifier is generated by a processor or entered by a user.

The room identifier links the segment control functions 28 to the room control functions 30. For example in FIGS. 4A and 7, one room area object 44 is assigned a number (e.g., room 12). The segment object 54 is assigned the same number (e.g., 12) to link the segment 20 to the room 22. Other segment objects 54 may be linked to the same or different room area objects 44 by the same or different identifiers. In other embodiments, segment identifiers are listed with the room object 44.

The identifier is placed in the room area object 44 and/or segment area objects 54. A separate field is provided. In one embodiment, the identifier is automatically generated in the room area object 44, and placed in the segment area object 54 based on user input linking the segment 20 to the room 22, grouping segments 20 for a same room 22.

Figure 4B:
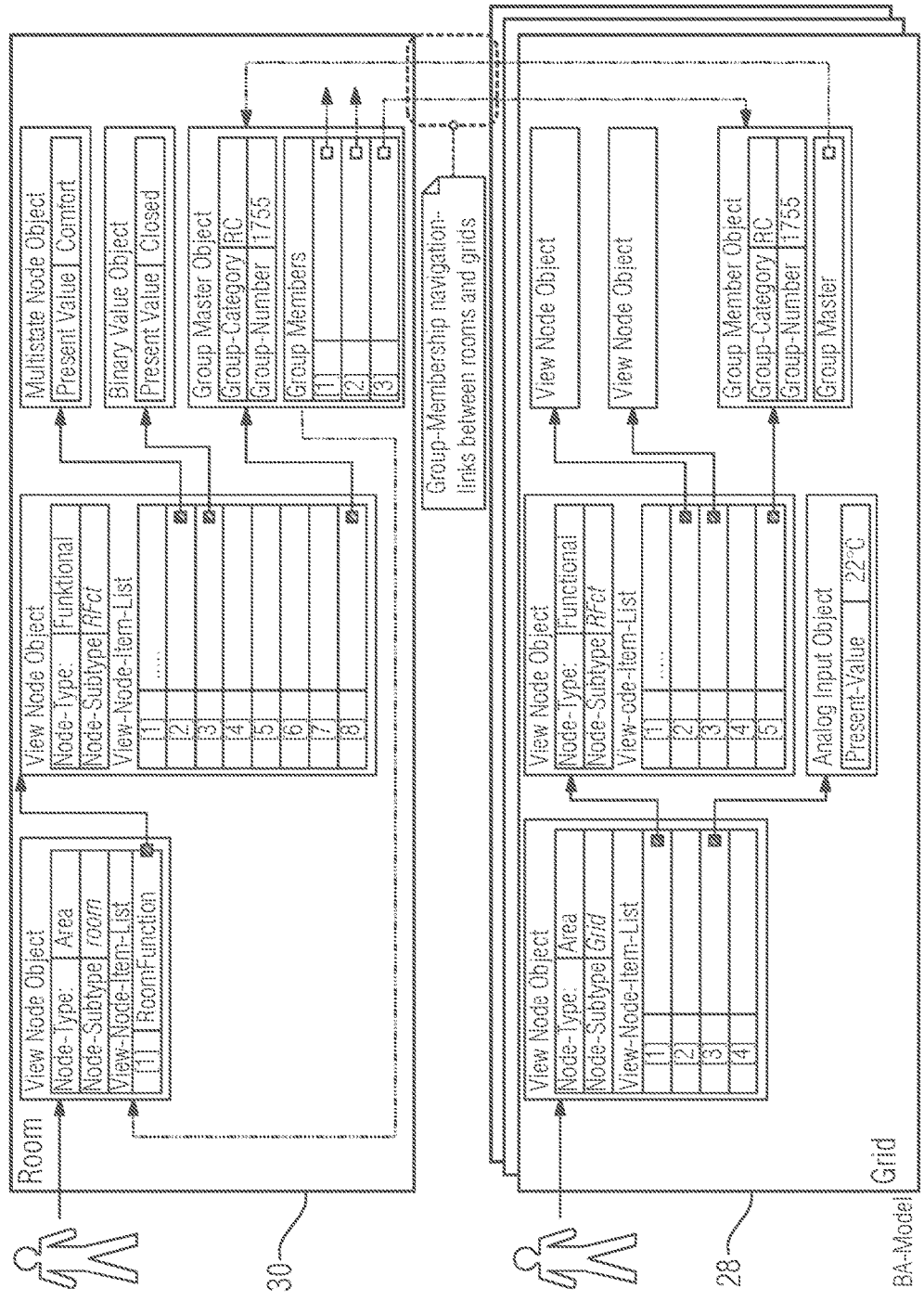

Other grouping may be provided, such as grouping different objects for implementing the room and segment control functions. As shown in FIGS. 4A and 4B, a group master object 52 may be used to implement linking of objects. The group master object 52 has a group category identifier and a group number identifier. The category identifier is used to differentiate groups between independent application or control program domains, such as set point control groups, occupancy driven control groups, HVAC control groups, and lighting control groups. The group number identifier is used to group objects. The group master object 52 may be operatively connected to the respective segment area objects 54 and is configured to exchange common data corresponding to the group of the building automation objects that have the same group category identifier and the same group number as the group master object 52. The grouping of segments 20 with a room 22 may alternatively use the group master object 52, such as linking by all objects in the segment and room control functions 28, 30 with a same group number identifier. The grouping is the same grouping and same mechanism used to connect room segments to rooms. The assignment of room masters to room segment members is used for the linking and the data transfer goes then via this group link.

Figure 5:
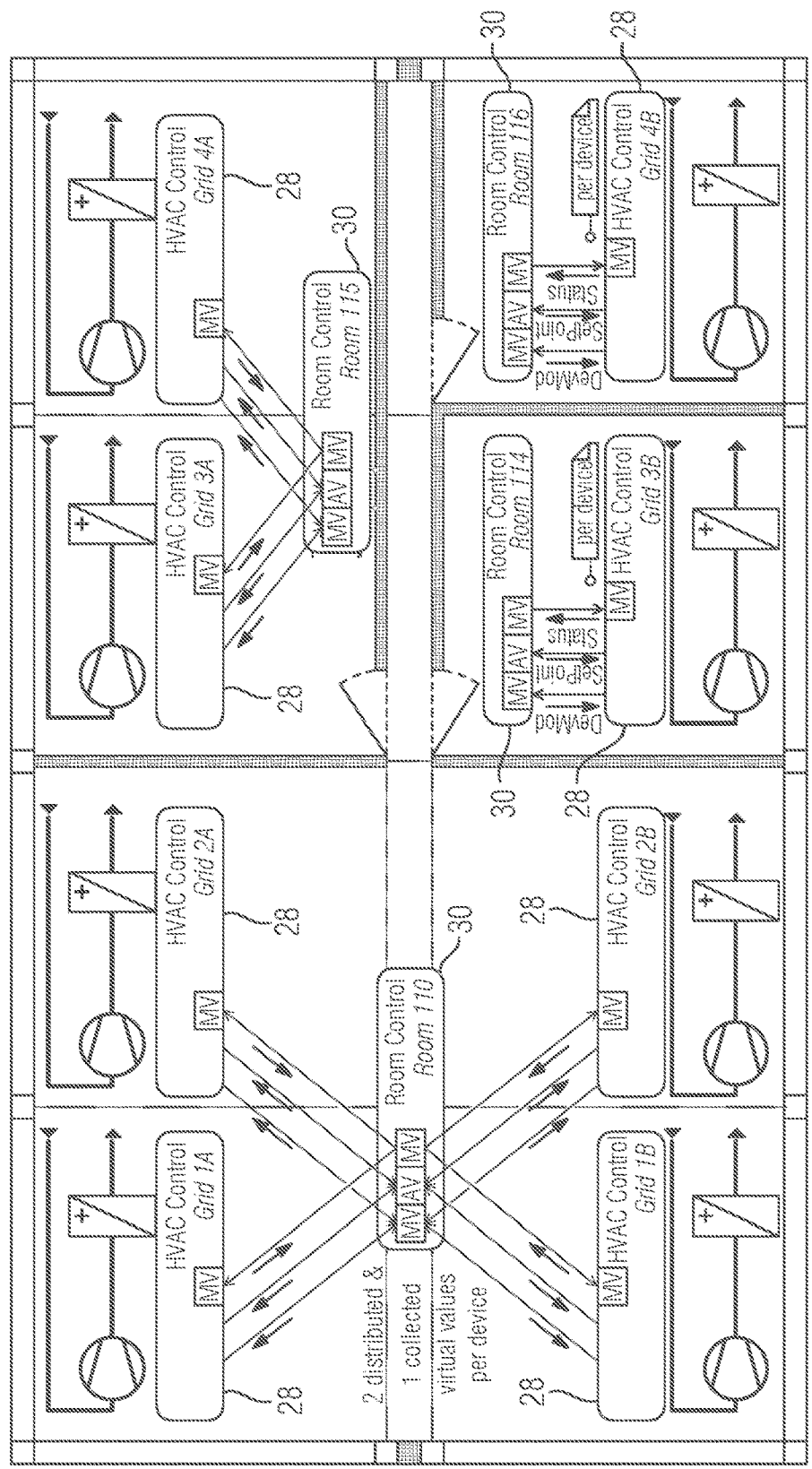
FIG. 5 illustrates data transfer of information between segment and room functions.

In one embodiment, the segment-to-room linking identifier information and member objects having the same group category identifier operate together to control the equipment 24 of the room 22 (e.g., to perform central set point control, central HVAC control, central lighting control, central blind control, some combination thereof, or other central control function for the building automation system). FIG. 5 shows operation using the separated room and segment control functions 30, 28. The controller 26 or controllers 26 are configured to exchange data and set points between the room objects and linked segment objects based on the room identifier. Different sensors, such as room temperature sensors, window contacts, or presence detectors, may be installed per room segment 20. The room function 30 collects the individual room-related sensor values (MV) and calculates resulting values (AV) (e.g., average, min, max, logical, or other combination of values sensed from different segments) to be used as virtual values for the automation of the whole room space. Similarly, a room unit (i.e. an operator panel for operating and monitoring a room by a building user) may be installed in each room segment. The room function 30 collects individual room-related commands, such as new set point values, room operating mode, or fan stages and uses the last commands entered on any room unit for the room 22 as virtual values for the automation of the whole room space. Additionally, the room function 30 distributes the actual values, such as the current average the room temperature, the current room operating mode, or the current fan stage to the individual room units to be displayed. To coordinate the automation and control logic of the different pieces of equipment in every room segment 20, the room function 30 distributes a common device mode and set point for each device to all linked room segments 20 and collects the different device statuses from all segments 20.

As a result of splitting the functionality into room control function 30 and room segment control functions 28, many (e.g., 30-40) process data items may be exchanged between a room control function 30 and the associated room segment control functions 28. Process data items include measures, sensed values, set points, virtual set points, or other control, feedback, or loop information. For example, FIG. 5 shows the exchange of status, set point, and device mode (e.g. command how the specific device is to work) for fan and chiller operation. Process data is collected for and/or provided to any of the equipment 24. For example, the sensed temperature from four different segments in a same room is provided by the segment control functions 28 to the room control function 30. The room control function 30 averages, selects the median, or performs other operation to determine a virtual temperature for the room 22. The virtual temperature is provided to the segment control functions 28 for controlling the HVAC equipment in a feed-back loop. More process data may be exchanged where the segment control functions 28 are operated differently rather than in common for a same room 22.

Similarly, many (e.g., 20-30) operation and/or monitoring data items may be exchanged between a room control function 30 and associated room units installed in different room segments 20. Room units may display various types of information, provide various user settings, or perform other operations associated with a room 22 or segment 20 user interface to the building automation. As a result, various data items are exchanged with room units.

U.S. Published Application No. 2013-0218349 (Ser. No. 13/851,695) discloses example exchange of information by grouping for group communications between different objects of control functions. As shown in FIGS. 4A and 5, common data for a central set point control between a plurality of building automation devices across a network is communicated. The common data is associated with one or more building automation objects (e.g., 44-58) representing points associated with a plurality of devices controlled or monitored in a building by the controllers 26. The objects are grouped by the group master number. The first view node object 44 has a first list (also referenced as "view node item list") that includes a list of a plurality of semantic information units or building automation object identifiers. Each of the semantic information units in the first list identifies and is linked to a corresponding one of a group of the building automation objects (e.g., objects 46 and 58 for object 44, and objects 48, 50, and 52 for object 46) that represent and store the set points or other data corresponding to the building automation object identifiers. In addition, the first list or view node item list of the view node object 44 includes a semantic information group identifier corresponding to and defining a group relation with the group master object 52.

For communicating the data, electrical or wireless communication media are used. Examples of technologies or standards able to be used for the data exchange are BACnet, LON or LonWorks® from the company ECHELON, the European Installation bus EIB, KONNEX, ZigBee or PROFIBUS defined by German standard DIN 19245. BACnet refers to the ANSI/ASHRAE 135-2008 building communication protocol standard, titled "BACnet, A Data Communication Protocol For Building Automation And Control Networks" (2008).

To implement the segment-to-room grouping mechanism for the room control function 30, a first view node object 44 operatively connects to the first control program, and an identifier of the object 44 is used in any linked segment objects 54. One grouping is used to identify objects and link.

Alternatively, two types of grouping are provided. In the first, the group number (e.g., see object 52) identifies the various objects regardless of segment or room function operating together for data exchange. In the second, the room identifier links the objects for segment control functions 28 to objects for room control functions 30. In addition to grouping the objects for operation, the segment control functions 28 are linked to the room control function 30 by another group identifier. FIG. 4B shows the linking for segments to rooms using group master and group member objects. The grouping for communications is also used for grouping segments with rooms.

Figure 7:
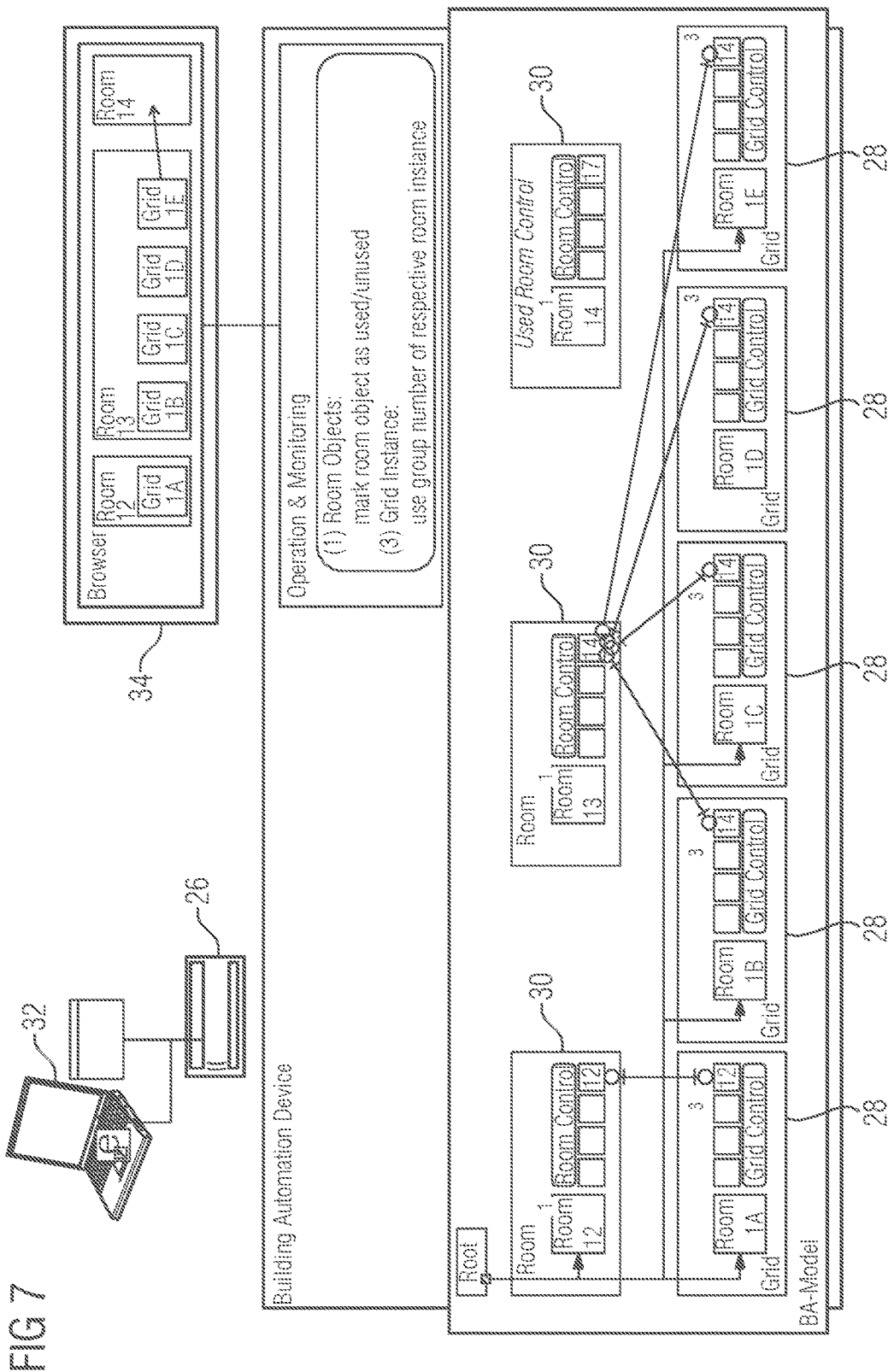
FIG. 7 illustrates use of room identifiers for assigning segments to room functions.

FIG. 7 shows the room identifiers—room 12, room 13, and room 14. By using grouping based on room control functions 30 and segment control functions 28, design of building automation for an initial floor plan and alteration for later change of a floor plan is simplified. By linking the room and segment objects (e.g., linking segments 20 to rooms 22), groups for exchange of information are formed without further user input or manual programming. For a flexible room arrangement between a room 22 and room segments 20, the data exchange is initially set up and automatically adapts for each involved room segment 20 in case of rearranging room spaces by adding and removing walls or when changing functionality. The control functions 28, 30 distribute common data to associated group member functions and collect group member data from the group member functions, as well as to set up and change the group membership of the functions in a simple way.

Figure 6:
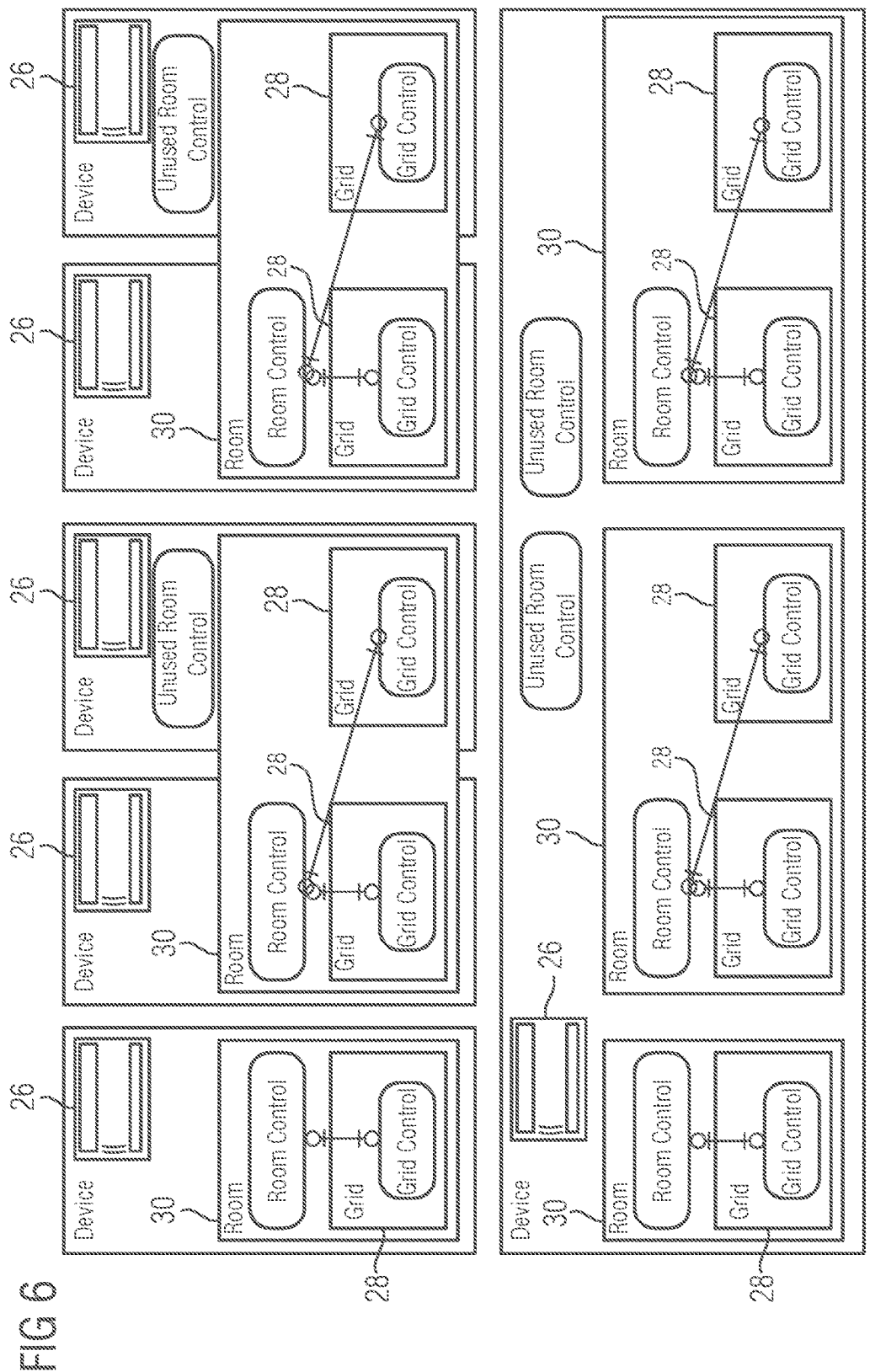
FIG. 6 illustrates links between segments and room functions.

Due to the room 22 and segment 20 linking, one or more room control functions 30 may not be used. For example, FIG. 6 shows unused room control functions. Since multiple segments 20 and corresponding control functions 28 may be linked to one room control function 30, some room control functions 30 are not used but are provided in case the rooms are rearranged. In the example of the compact controllers 26, one of the controllers 26 may operate the room control function 30 and a segment control function 28 while another controller 26 only operates a segment control function 28 and hosts an unused room control function 30. In the example of the modular controller 26, the controller 26 hosts the room control functions 30, both used and unused, as well as hosting the used segment control functions 28.

FIG. 4A shows a data field in the objects 44-58 used by the control functions 28, 30 for designating whether the object is used or not. The objects are flagged as used or unused. For example, object 44 and the corresponding objects 46-52 of the room control function 30 are flagged as unused. The objects 54-58 of the segment control function 28 are linked by a room identifier to a different room control function 30, which has objects flagged as used.

If the floor plan changes, the linking may be reassigned. The room identifier assigned to a given segment control function 28 may be altered from one room 22 and corresponding room control function 30 to another. In the example of FIG. 7, the segment 20 for grid 1E is to be moved from Room 13 to Room 14. The interaction of the segment control function 28 with the old room control function 30 (room control function for room 13) ceases. Data exchange is no longer provided since the linking by the room identifier is removed. By simply changing the identifier or label for grouping, the segment control function 28 for grid 1E interoperates with the room control function 30 for Room 14. Without changing anything other than the grouping for the control program, the newly linked objects communicate for providing building automation.

When reassigned by changing the room identifier, the previously connected room control function 30 may no longer interact with a segment control function 28. If so, then the previously linked room control function 30 is designated as unused. If a segment 20 is still linked, then the room control function 30 remains flagged as used.

For a new linking due to a floor plan change, the grouping indicated by the room identifier is altered. This alteration results in the objects for the segment control function being linked or grouped with the objects for the new room control function 30. Since the objects interoperate with each other in a modular arrangement, changing the room identifier is sufficient to begin interaction of the objects for the segment control function 28 with the room control function 30. Data exchange, such as measured temperature, set points, and/or virtual temperature, may be performed without additional user input other than the change to the room identifier. The object-oriented programming allows for redesign by an alteration in grouping without the user having to manually link multiple call functions to specific devices. When the initial arrangement is later changed by adding and removing wall, the marking of respective room control functions 30 as used/unused and the room segment membership are adapted without more extensive re-programming or design. Download of a separate control function designed for the floor plan may be avoided or is not needed. An offline developed control function is not needed as the existing control functions may be used with the different grouping.

The controller 26 receives input on an interface for linking the segments 20 with rooms 22. The interface is the networking interface 16 of FIG. 3 and/or a user interface 34 (see FIG. 7). In one embodiment shown in FIG. 7, a computer 32 provides the linking input through the networking interface 16. The user interface 34 is on the computer 32. Alternatively, the user interface 34 is provided on a display of the controller 26.

In an online embodiment, the user may change linking using the user interface 34 of the controller 26. While a workstation is generally used to make modifications and/or changes to one or more of the various components of the building automation system, a field panel may also be operative to enable modifications and/or changes. Since only limited input in the form of changing a room identifier may be needed, limited user interfaces may be used to make the change. For example, the user selects a room segment and enters a room identifier. As another example, the user selects a room and selects one or more segments, causing the processor to link the segments 20 with the room 22. In yet another example, the user drags a graphic of a segment 20 to a room 22, or vice versa. The user interface that may allow changing set points may be used to reconfigure the segments 20 relative to rooms 22 since manual programming is not needed to change the control functions. Scroll buttons, a number pad, an LED display, and/or touch screen may be used to link rooms 22 and segments 20.

In another embodiment, the computer 32 is an offline engineering station. An engineering tool generates the user interface. Drag and drop processes may be used to drag graphics of objects, control functions, segments, and/or rooms to each other. For example, the engineer drags segments of the floor plan presented graphically to a graphic representing a room. The computer 32 sets the room identifier based on this operation. As another example, the engineer manually enters the room identifier into the objects for segments to be linked to the room 22. Once configured offline, the linking and/or created objects are downloaded to or provided to the controller 26 through the network interface 16.

In another embodiment, the computer 32 is a workstation, personal computer, installation tool, or management station with access to the building automation network. Using the graphics, menu selection, identifier entry, or other user interface operations, the segments 20 are linked to rooms 22 with the computer 32 connected with the building automation network. Building automation systems may have one or more centralized control stations in which data from each of the points or elements in the system may be monitored and in which various aspects of system operation may be controlled and/or monitored. To allow for monitoring and control of the dispersed control system points or elements, building automation systems may employ multi-level communication networks to communicate operational and/or alarm information between operating elements, such as sensors and actuators, and the centralized control station. This management station may be used, while connected to the network of the building automation system or online, to set up or alter the linking.

FIG. 7 shows an example of the user dragging a graphic (e.g., Grid 1E) of a segment 20 to a graphic (e.g., Room 14) of a room 22. This dragging and dropping causes the room identifier for the segment 20 to change to the identifier for Room 14 instead of Room 13. The operation may also alter the indication of used or unused for the room control function. FIG. 7 shows another example. Four segments 20 and corresponding segment control functions 28 are linked to a room 22 and corresponding room control function 30 identified as Room 14. One or more of these identifiers may be changed to the currently unused room control function 30 by altering the identifier to Room 17. The user types in, selects from a drop down list, or otherwise inputs the room identifier Room 17. The change for reassigning is received at the user interface 34 and/or the network interface 16. In an alternative embodiment, the user enters a list of segment identifiers into the room control function 30 for grouping.

In another embodiment, the interface is a sensor or user input interface, such as a port or the network interface 16. A sensor detects a position of a wall or a change in position of a wall. Alternatively, the user input is activated to change a wall position. For example, a conference room may have an automatically or manually operated wall for dividing a room into two or other number of rooms. Upon or during a change in the wall position, the building automation may automatically change configuration. For example, the wall separates a space into two rooms, each of one segment. Separate room control functions are used. When the wall is opened, creating one space from the two segments 20, one of the segment control functions 28 is changed to operate with the other room control function 30 by the controller 26 changing the room identifier. The old room control function 30 is flagged as unused by the controller 26, all without any input by the user other than to change the wall position. When the wall is closed again, the controller 26 changes the control functions 28, 30 back.

FIG. 8 is a flow chart diagram of one embodiment of a method for arranging rooms in building automation. The acts of FIG. 8 deal with initially configuring building automation by linking room segments with rooms and/or changing the linkings where a rooms are altered. For example, the acts deal with engineering of initial room and room segment configuration by linking room segments to rooms, controlling the rooms and room segments in the current configuration, changing the linking between room segments and rooms online or offline by drag and dropping a room segement into another room (or other change input), automatically setting specific building automation objects to used or unused, and then returning to controlling in the now current configuration.

Additional, different, or fewer acts may be provided. For example, act 34 is not provided where the method is for initial configuration. As another example, act 32 is not provided, such as where the method represents designing the building automation system.

The method is implemented by the controllers 26 of FIG. 1 or 2, the controllers 26 with the computer 32 of FIG. 7, the computer 32, the interface 16, 34, the device of FIG. 3, or another system and/or component. The acts are performed in the order shown or other orders.

In act 30, room segment functions are linked to room functions. For example, two or more segment functions are linked to a single room function. As another example, one segment function is linked to one room function. For a floor plan with multiple rooms, combinations of one-to-one and two or more-to-one segment-to-room function linking may be used. For example, tens of rooms have a one-to-one segment function-to-room function linking, and a fewer number of rooms have two or more segment functions linked to each room function.

The linking is by identifiers or other label. The functions are grouped using a common label. A different identifier is used for each segment and room function group. In one embodiment, a room identifier is used, such as a room number or name. In other embodiments, the identifiers are unique amongst the rooms but not necessarily descriptive of the rooms. By indicating the same identifier for each group of one or more segment functions for a room function or indicating segment identifiers for each room function, a group of segments to operate as a room are identified.

The linking is by a user or processor. For example, the user interacts with a user interface to enter, select, or otherwise indicate which segment functions belong with which rooms. In one embodiment, an offline engineering of the room arrangement is performed. An engineering tool is used to set up the grouping. Room objects are created. A unique label for each room or group is selected or generated and assigned to a group object for the room function. This unique label for a given room is assigned to all of the group member objects of the segment functions. The grouping is then loaded onto the appropriate controllers.

In act 32, environmental control equipment is operated for each of a plurality of segments of a floor with a corresponding room control. The equipment for different segments in a same room are operated using the same room control based on the linking. The equipment for segments of different rooms are operated using different room control. Data transfer is provided during operation by using grouped segment and room data objects. Within a room control function, multiple objects may be grouped. Within a segment control function, multiple data objects may be grouped. Based on the linking, the data objects for the room and segment are grouped. The identifier or label liking the segments to rooms is used to group the objects and corresponding control functions.

By operating the segment and room functions separately, flexibility is provided in the building automation system for changes in the floor plan. The room functions are for room level operations, and the segment functions are for operating collections of equipment. This separation allows different equipment to be linked to different rooms at different times without requiring extensive redesign of the building automation control.

In act 34, the linking is changed. One or more segment functions are shifted to link to one or more different room functions. For example, one segment function is shifted from an original room function to a different room function.

The change occurs by altering the label. For example, the room identifier (e.g., Room 13) in the segment function is changed from an identifier (e.g., Room 13) of the original room function to an identifier (e.g., Room 14) of the different room function.

Any mechanism for change may be used. For example, a processor automatically causes the change. As another example, a user inputs the change in a user interface, such as by dragging a graphic for a segment identifier and/or corresponding equipment to a graphic for the different room. This disconnects or ungroups the segment function from the original room and groups the segment function with the control function for the different room. The label in the objects for the control functions is altered to the new linking.

In one embodiment, the change occurs online, such as by or using a controller also implementing control functions or by using a management station. For example, a web-application presents a user interface. Based on changes entered by the user, the linking is altered in the controllers connected through the building automation network.

In another embodiment, the change occurs automatically as a position of a wall changes. In response to a wall changing position, such as a sliding wall being moved, the linking is altered. Based on sensing by a contact or other sensor or based on activation of the motor for moving the wall, the controller alters the linking. The control program automatically adapts the room configuration for the respective room arrangement. The control program changes the group number of the group member object to the group number of the new room function.

In act 36, any room functions no longer linked with a segment function are flagged as unused. The flag for a room function is changed from used to unused so that continued operation does not require processing unneeded control functions. When the equipment 24 is operated, unused control functions are not needed since the segment functions corresponding to the equipment 24 are linked to other room functions. The control program is still running, but some parts may be deactivated. This information is used by an intelligent client to decide which data points are used/unused (e.g. whether the client can see or cannot see a specific datapoint) and how to automatically generate adapted room visualizations when reassigning room segments to rooms.

After the change in linking and updating the usage flag, the building automation control functions and corresponding objects are used for operation again in act 32. Based on the existing groupings, room and segment control functions perform data exchange to control the equipment. A controller runs the control functions based on the identifying labels. Segments linked with rooms operate for that room and not others. Different room controls operate with different segment functions depending on the linking.

The operation after the change in linking occurs without replacing the control functions. The grouping is changed, but the close or open loop functions are not changed other than the source of data, destination of data, and controlled equipment. The room and segment control functions are modular so interact with each other based on the linking. The room control function operates with any number of segments, so adding and removing segments does not alter the operation of the room control function other than with what segments communications occur. A change in the linking does not require a change in the control function other than the grouping. Downloading of a new room or segment function for operating the controller may be avoided. Information is exchanged based on the linked segment and room functions using the linking label.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system for arranging rooms in building automation, the system comprising:
   a plurality of sets of environmental control equipment, each set of environmental control equipment being assigned to a separate segment of a floor of a building;
   one or more controllers for the floor of the building, the one or more controllers configured to control the sets of environmental control equipment; and
   an interface configured to receive input linking the segments of the floor of the building with rooms of the building, the linking assigning a room identifier to one or more respective segments linked with the room;
   wherein the one or more controllers include room objects and segment objects,
   wherein the segment objects are configured to control respective sets of the environmental control equipment,
   wherein the linking for segments to rooms is performed by using group master and group member objects and a particular segment is linked to a particular room using an identifier of a corresponding room control function including room control strategies regarding commands and set points for at least one set of environmental control equipment, and
   wherein the room objects are configured to control an environment of the respective rooms of the floor, and further configured to interact with the linked segment objects having the corresponding room identifiers.

2. The system of claim 1 wherein the interface is configured to receive a change in a linking of one of the segments from a first one of the rooms to a second one of the rooms, the change reassigning the one segment from the room identifier of the first room to the room identifier of the second room,
   wherein the controllers are configured such that the room object for the first room ceases interaction with the segment object for the one segment and the room object for the second room begins interaction with the segment object for the one segment based on the change.

3. The system of claim 2 wherein the one or more controllers are configured to exchange data and set points between the room objects and linked segment objects based on the room identifier without additional user input other than the change.

4. The system of claim 1 wherein the interface comprises a user interface, and wherein the input comprises a user dragging graphics of the segments to graphics of the rooms or the user assigning the room identifier to the segments.

5. The system of claim 1 wherein the sets of environmental equipment comprise heating, ventilation, and air conditioning equipment, lighting equipment, shading equipment, room units, or combinations thereof.

6. The system of claim 1 wherein the one or more controllers comprise a multi-room controller configured to operate the room objects for the rooms and the segment objects for the segments.

7. The system of claim 1 wherein the one or more controllers comprise a compact controller for each of the segments, each compact controller including the respective segment object, and one of the compact controllers for each of the rooms including the room object.

8. The system of claim 7 wherein other compact controllers for one of the rooms than the one compact controller include the respective room objects flagged as unused and the one compact controller includes the respective room object flagged as used.

9. The system of claim 1 wherein the interface comprises a user interface of a computer hosting an engineering tool.

10. The system of claim 1 wherein the interface comprises a user interface of the one or more controllers.

11. The system of claim 1 wherein the interface comprises a sensor interface configured to receive the input linking as a sensed change in a wall.

12. The system of claim 1 wherein the interface comprises a management station configured to reassign the linking of one of the segments to another of the rooms, and wherein the one or more controllers are configured to operate with the room and segment objects with the reassigned linking and without downloading a control program from the management station to the one or more controllers.

13. A method for arranging rooms in building automation, the method comprising:
operating first environmental control equipment of a first segment of a floor of a building with a first room control;
changing a first value of a first room identifier for the first segment to a second value, the first value linked with the first room control and the second value linked with a second room control, the first room control corresponding to a first room of the floor and the second room control corresponding to a second room of the floor; and
operating, by a controller, the first environmental control equipment of the first segment of the floor with the second room control after the changing and without downloading the second room control to the controller as part of or after the changing,
wherein the linking for segments to rooms is performed by using group master and group member objects and a particular segment is linked to a particular room using an identifier of a corresponding room control function including room control strategies regarding commands and set points for at least one set of environmental control equipment.

14. The method of claim 13 further comprising: altering a flag for the first room control from used to unused.

15. The method of claim 13 wherein changing comprises dragging a first graphic for a segment identifier for the first environmental control equipment to a second graphic for the second room.

16. The method of claim 13 wherein changing comprises receiving a change in a position of a wall of the floor and changing in response to the change in position of the wall.

17. The method of claim 13 further comprising flagging the first room control as unused for the operating of the first environmental control equipment of the first segment of the floor with the second room control.

18. The method of claim 13 wherein operating the first environmental control equipment with the first room control comprises controlling the first environmental control equipment with a first segment data object and controlling the first segment data object with the first room control, the first segment data object including the first room identifier, and wherein operating the first environmental control equipment with the second room control comprises controlling the first environmental control equipment with the first segment data object and controlling the first segment data object with the second room control, the first room control and the second room control configured to operate with different linkings of different segment data objects, including the first segment data objects, without replacement.

19. A non-transitory computer readable storage medium having stored therein data representing instructions executable by a programmed processor for arranging rooms in building automation by:
operating room segment functions and room functions separately, the room functions corresponding to rooms of a floor and the room segment functions corresponding to respective collections of environmental control equipment;
linking multiple of the room segment functions to a first one of the room functions by a label of the first room function;
linking a second of the room segment functions to a second one of the room functions by a label of the second room function; and
exchanging information between the linked room segment functions and the respective room functions based on the corresponding label,
wherein the linking for segments to rooms is performed by using group master and group member objects and a particular segment is linked to a particular room using an identifier of a corresponding room control function including room control strategies regarding commands and set points for at least one set of environmental control equipment.

20. The non-transitory computer readable storage medium of claim 19 wherein the instructions are further executable to:
change the linking of the second room segment function to the first room function with a change to the label of the first room function; and
flag the second room function as unused.

* * * * *